(12) United States Patent
Cohen et al.

(10) Patent No.: US 7,983,502 B2
(45) Date of Patent: Jul. 19, 2011

(54) VIEWING WIDE ANGLE IMAGES USING DYNAMIC TONE MAPPING

(75) Inventors: Michael Cohen, Seattle, WA (US); Matthew Uyttendaele, Seattle, WA (US); Johannes Kopf, Constance (DE)

(73) Assignee: Microsoft Corporation, Redmond, WA (US)

( * ) Notice: Subject to any disclaimer, the term of this patent is extended or adjusted under 35 U.S.C. 154(b) by 1016 days.

(21) Appl. No.: 11/834,238

(22) Filed: Aug. 6, 2007

(65) Prior Publication Data

US 2009/0041375 A1 Feb. 12, 2009

(51) Int. Cl.
*G06K 9/40* (2006.01)

(52) U.S. Cl. .................... 382/254; 382/100; 382/274

(58) Field of Classification Search ............ 382/100, 382/254, 274

See application file for complete search history.

(56) References Cited

U.S. PATENT DOCUMENTS

| | | | |
|---|---|---|---|
| 7,023,580 B2 | 4/2006 | Zhang et al. | |
| 7,136,073 B2 | 11/2006 | Newman | |
| 7,146,059 B1 | 12/2006 | Durand et al. | |
| 7,239,757 B2 | 7/2007 | Kang et al. | |
| 7,561,731 B2 * | 7/2009 | Wallace et al. | 382/154 |
| 7,747,098 B2 * | 6/2010 | Ward | 382/254 |
| 7,753,530 B2 * | 7/2010 | Whitehead et al. | 353/30 |
| 2006/0158462 A1 | 7/2006 | Toyama et al. | |
| 2006/0209005 A1 | 9/2006 | Pedram et al. | |
| 2006/0268180 A1 | 11/2006 | Chou | |
| 2007/0014470 A1 | 1/2007 | Sloan | |
| 2007/0104387 A1 | 5/2007 | Han et al. | |
| 2007/0201560 A1 | 8/2007 | Segall et al. | |

OTHER PUBLICATIONS

YouTube video: "Capturing and Viewing Gigapixel Images" by Johannes Kopf, Matt Uyttendaele, Oliver Deussen, and Michael Cohen, submitted by user "Johanns0r", available as of May 14, 2007 at http://www.youtube.com/watch?v=B5UUrxL_2t0.*

Durand, F., J. Dorsey, Fast bilateral filtering for the display of high-dynamic-range images, ACM Transactions on Graphics, 2002, vol. 21, No. 3, pp. 257-266.

Fattal, R., D. Lischinski and M. Werman, Gradient domain high dynamic range compression, Proc. of ACM SIGGRAPH, 2002, pp. 249-256, vol. 21, No. 3.

HDP, HDRP Photo, Microsoft Corporation, 2006, available at http://www.microsoft.com/whdc/xps/wmphoto.mspx, Nov. 2006.

Lischinski, D., Z. Farbman, M. Uyttendaele, and R. Szelinski, Interactive local adjustment of tonal values, ACM Transactions on Graphics, pp. 646-653, vol. 25, No. 3, 2006.

Reinhard, E., Parameter estimation for photographic tone reproduction, Journal of Graphics Tools, vol. 7, No. 1, pp. 45-52, 2002.

Reinhard, E., M. Stark, P. Shirley, and J. Ferweda, Photographic tone reproduction for digital images, ACM Trans. On Graphics, 2002, vol. 21, No. 3, pp. 267-276.

Kopf, J., M. Uyttendaele, O. Deussen, M. F. Cohen, Capturing and viewing gigapixel images, ACM Trans. on Graphics (TOG), Jul. 2007, vol. 26, No. 3.

Larson, G.W., H. Rushmeier, C. Piatko, A visibility matching tone reproduction operator for high dynamic range scenes, IEEE Trans. on Visualization and Comp. Graphics, Dec. 1997, vol. 3, No. 4.

* cited by examiner

*Primary Examiner* — Bhavesh M Mehta
*Assistant Examiner* — Stephen R Koziol
(74) *Attorney, Agent, or Firm* — Lyon & Harr, LLP; Richard T. Lyon

(57) ABSTRACT

A dynamic tone mapping technique is presented that produces a local tone map for a sub-image of a wide-angle, high dynamic range (HDR), which is used in rendering the sub-image for display. The technique generally involves first computing a global tone map of the wide-angle, HDR image in advance of rendering the sub-image. The global tone map is then used during rendering to compute a local tone map based on the average luminance and contrast of the pixels of the sub-image. In addition, the sub-image can be tone mapped as part of the rendering of a sequence of sub-images during a viewer-executed panning and/or zooming session. In this case, the local tone maps can be kept from changing too rapidly by adding a hysteresis feature to smooth out the intensity changes between successive sub-images.

19 Claims, 5 Drawing Sheets

Exemplary Original Luminance Histogram

Luminance Histogram With Average Luminance Shifted

Luminance Histogram With Average Luminance Shifted And Luminance Range Stretched

VIEWING WIDE ANGLE IMAGES USING DYNAMIC TONE MAPPING

BACKGROUND

A normal image is typically captured with a camera having a 30-70 degree field of view. Special cameras and lenses can produce much wider fields of view, and by using software multiple images can be stitched together into even wider fields of view all the way to a complete sphere. In addition, such images can be generated using a virtual camera viewing a virtual 3D world. These wide angle images often are high resolution and are created with a high dynamic range (HDR).

When viewing the foregoing wide angle images one often wants to be able to pan and zoom to examine a smaller portion of the image to appreciate the details. However, in order to display a sub-image of a wide angle, HDR image on a typical display device, tone mapping is needed. Tone mapping maps the tonal values of the HDR image to the limited dynamic range available on the display device. Typically, the whole image is "tone mapped" in advance of display so that much of the scene appears as natural as possible. This requires tradeoffs between very bright and very dark regions and maintaining a global contrast.

Unfortunately, this global tone mapping creates problems when zooming in on a wide angle image. For example, the details in a bright or dark region may not be clear owing to the use of the global contrast in tone mapping the pixels of the region. If it were known in advance what part of the image was to be displayed, then a very different tone mapping might be done—one which creates brightness and contrast level that make the details of the region stand out. A "local" tone map could be generated for the region of interest. However, it is impractical to pre-compute a local tone map for every possible sub-image that might be displayed.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The present dynamic tone mapping technique generally produces a local tone map for a sub-image of a wide-angle, HDR image. This tone map is then used in rendering the sub-image for display. The local tone map creates the brightness and contrast levels that make the details of the sub-image stand out by brightening dark regions and darkening light regions, while increasing the contrast in low contrast areas of the image. In addition, in one embodiment, the present technique can produce the local tone maps for sub-images on the fly so as to make it practical to tone map a sequence of sub-images being generated as part of a pan and zoom session.

In one exemplary embodiment, the present technique generally involves first computing a global tone map of the wide-angle, HDR image in advance of rendering the sub-image. The global tone map is then used during rendering of the sub-image to compute a local tone map based on the average luminance and contrast of the pixels of the sub-image. In addition, when the sub-image being tone mapped is part of a sequence of sub-images being rendered for display during a viewer-executed panning and/or zooming operation, the local tone maps can be kept from changing too rapidly by adding a hysteresis feature to smooth out the intensity changes between sub-images.

It is noted that while the foregoing limitations in existing tone mapping schemes described in the Background section can be resolved by a particular implementation of a dynamic tone mapping technique according to the present invention, this is in no way limited to implementations that just solve any or all of the noted disadvantages. Rather, the present technique has a much wider application as will become evident from the descriptions to follow.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 4 is a simplified graph of what a luminance histogram of a sub-image of the wide angle, HDR image might look like.

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present dynamic tone mapping technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
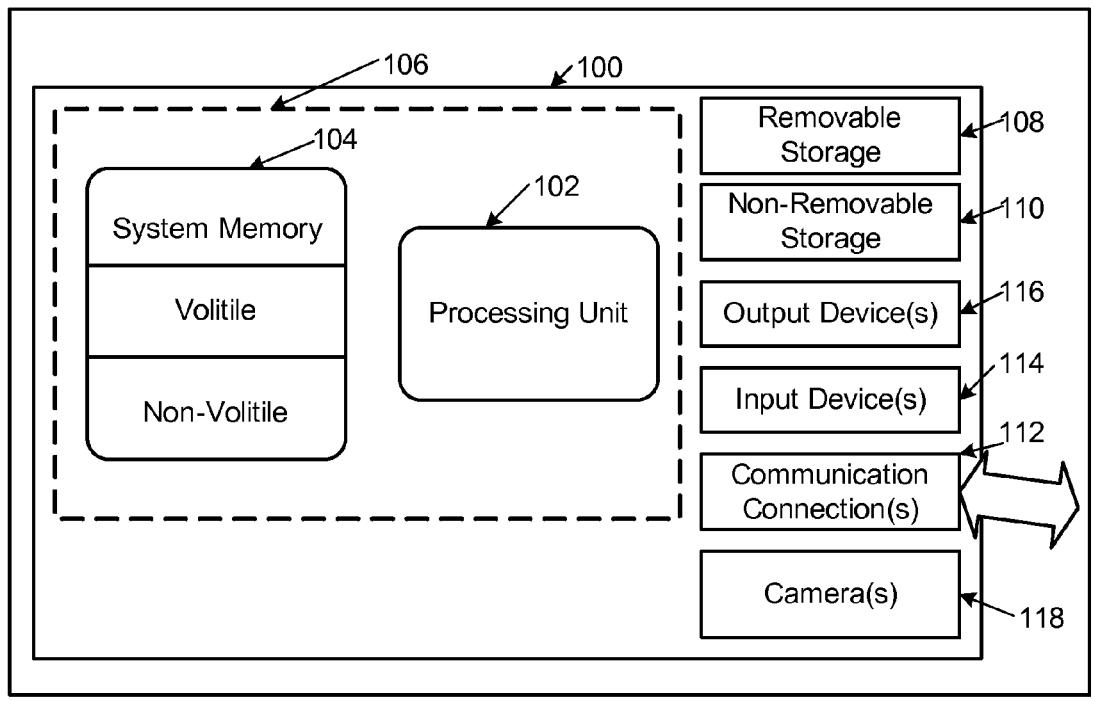
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present dynamic tone mapping technique. Neither should the computing environment be interpreted as having any dependency or requirement relating to any one or combination of components illustrated in the exemplary operating environment. With reference to FIG. 1, an exemplary system for implementing the present technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Device 100 can also include a camera 118 (such as a digital/electronic still or video camera, or film/photographic scanner), which is capable of capturing a sequence of images, as an input device. Further, multiple cameras 118 could be included as input devices. The images from the one or more cameras are input into the device 100 via an appropriate interface (not shown). However, it is noted that image data can also be input into the device 100 from any computer-readable media as well, without requiring the use of a camera.

The present dynamic tone mapping technique may be described in the general context of computer-executable instructions, such as program modules, being executed by a computing device. Generally, program modules include routines, programs, objects, components, data structures, etc. that perform particular tasks or implement particular abstract data types. The present technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present dynamic tone mapping technique.

2.0 The Dynamic Tone Mapping Technique

The present dynamic tone mapping technique produces a local tone map for each sub-image of the overall wide-angle, HDR image that is rendered for display. The local tone map creates the brightness and contrast levels that make the details of the sub-image stand out. In one embodiment, this is generally accomplished by employing a global tone map of the overall image and a fast local histogram-based tone mapper.

Figure 2:
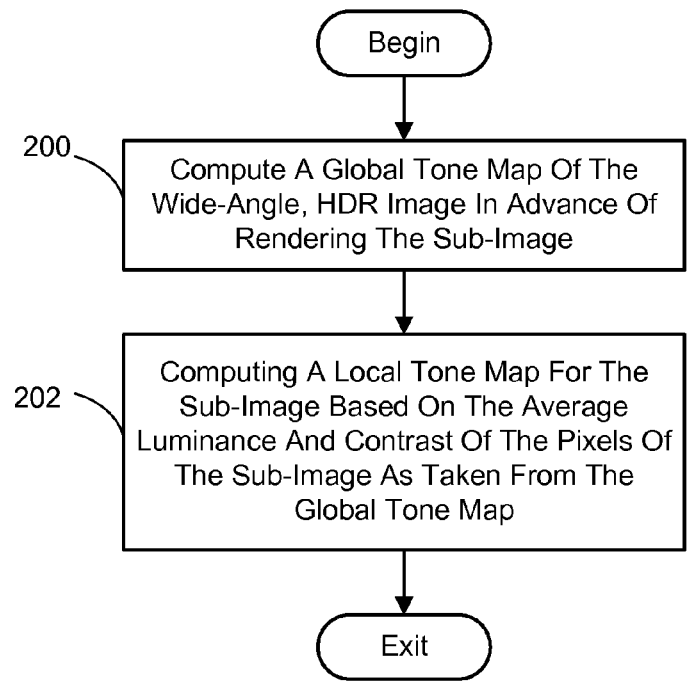
FIG. 2 is a flow diagram generally outlining a technique embodying the present invention for tone mapping a sub-image of a wide angle, HDR image.

More particularly, this embodiment of the present dynamic tone mapping technique produces a local tone map for a sub-image of a wide-angle, HDR image as generally outlined in FIG. 2. The technique begins with computing, in advance of rendering the sub-image, a global tone map of the overall wide-angle, HDR image (200). The global tone map is then used during rendering of the sub-image to compute a local tone map based on the average luminance and contrast of the pixels of the sub-image (202).

Any appropriate tone mapper can be employed to generate the global tone map. In one embodiment of the present technique, the tone mapper employed to create the global tone map output luminance values for each pixel of the wide-angle, HDR image which were mapped to the interval [0.1], where zero means totally black and one means pure white.

It is noted that applying the present dynamic tone mapping technique to each color channel of a color wide angle, HDR image could result in a color shift. To prevent this, the color model of the image is first converted to a luminance-chrominance color space model where the luminance values of each pixel represent its intensity. It is the luminance values that are tone mapped.

It is further noted that in addition to creating brightness and contrast levels that make the details of the sub-image stand out, the present dynamic tone mapping technique has another visually interesting result. A wide angle, HDR image of an outdoor scene will often depict areas in the distance that appear hazy owing to the atmospheric conditions. These hazy regions have the desirable effect of serving as visual depth clues in the overall image. However, when zooming in on one of these hazy regions, the present technique will effectively perform an "on the fly" haze removal operation allowing the details of the area to be more clearly seen.

The local tone map computation for a sub-image of the overall wide angle, HDR image will now be described in more detail in the sections to follow. In addition, when the sub-image being tone mapped is part of a sequence of sub-images being rendered for display during a viewer-executed panning and/or zooming operation, the local tone maps can be kept from changing too rapidly by adding a hysteresis feature to smooth out the intensity changes between sub-images. This embodiment of the present technique is also described in more detail in the sections to follow.

2.1 Computing the Local Tone Map for a Sub-Image

Figure 3:
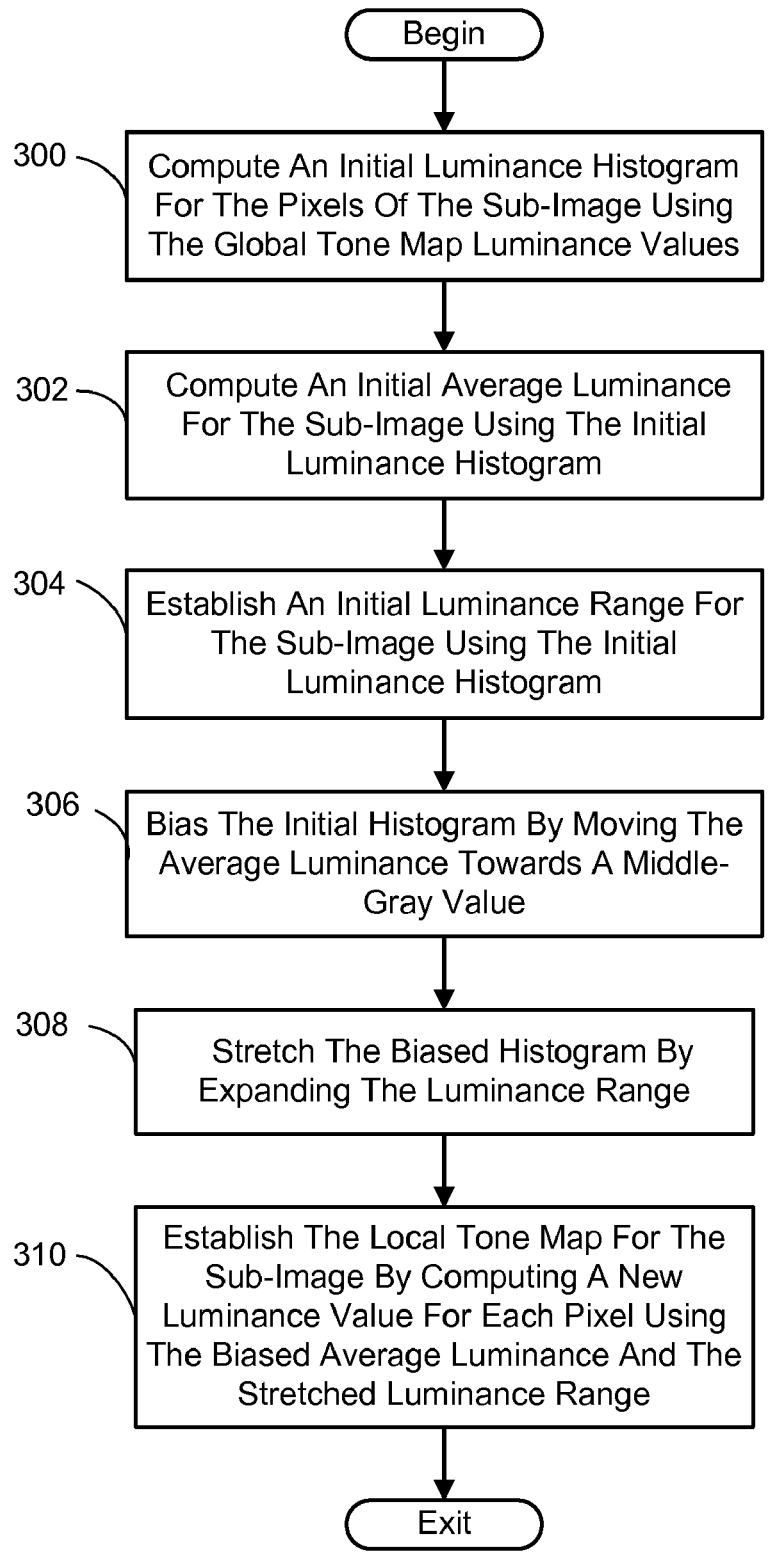
FIG. 3 is a flow diagram generally outlining one embodiment of a process for computing a local tone map for a sub-image of the wide angle, HDR image which biases the average luminance and stretches the luminance range of the pixels of the sub-image.
Figure 4:
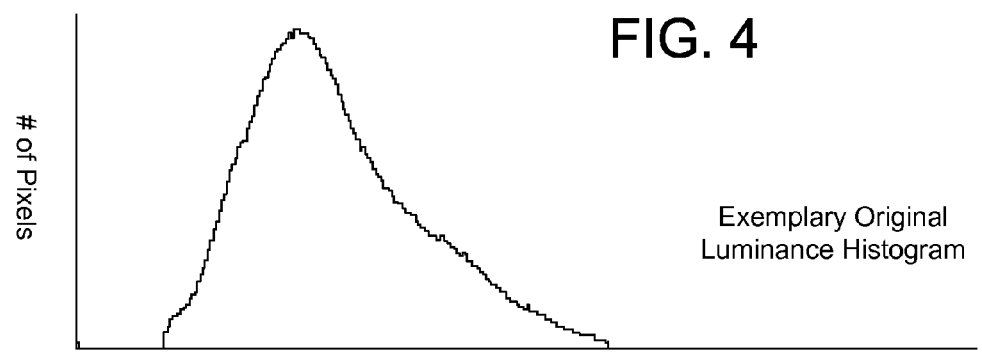

Referring to FIG. 3, computing a local tone map for a sub-image involves first computing an initial luminance histogram for the pixels of the sub-image using the luminance values assigned to the pixels in the global tone map (300). FIG. 4 shows a simplified graph of what a luminance histogram of a sub-image might look like. The vertical axis denotes the number of pixels and the horizontal axis shows the possible luminance values (at a prescribed resolution level). The graph indicates the number of pixels exhibiting each luminance value.

The initial luminance histogram is employed to compute an initial average luminance for the sub-image (302). This average luminance value is sometimes referred to as the "key" of the sub-image, and generally indicates whether the scene depicted is relatively light, neutral, or dark. In addition to the initial average luminance, the initial range of the luminance values is established from the initial luminance histogram (304). Generally, the initial average luminance is computed as the average of the luminance values associated with pre-scribed upper and lower percentiles of the initial luminance histogram, and the range is computed as the difference between these luminance percentiles. In tested embodiments of the present technique, the prescribed upper and lower percentiles were the 99th and 1st percentiles, respectively.

Figure 7:
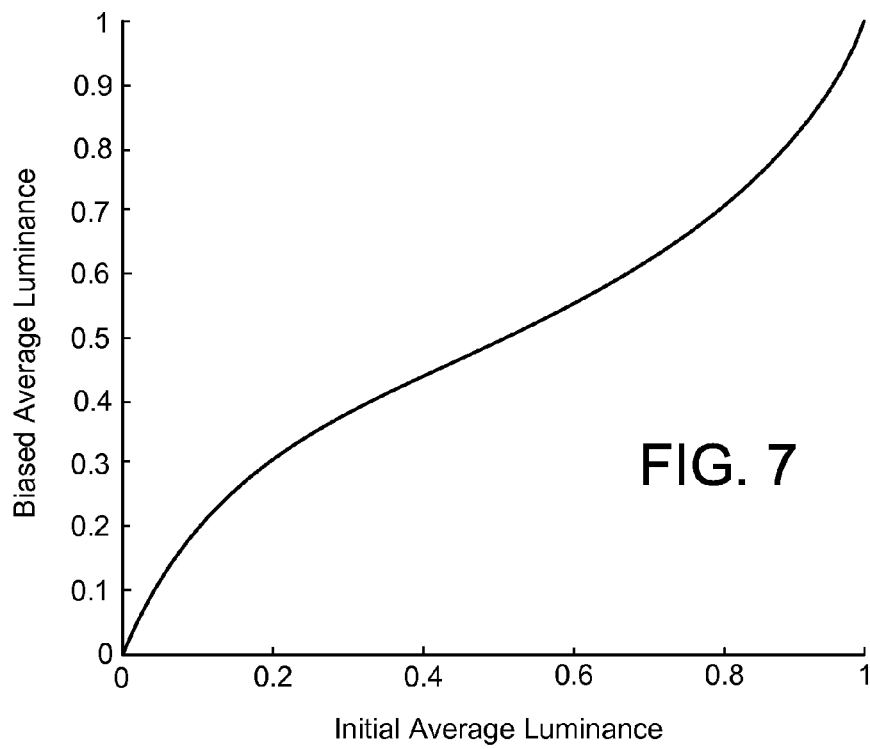
FIG. 7 is a graph of an exemplary key curve.

Next, the initial luminance histogram is biased and stretched. More particularly, the initial histogram is biased by moving the average luminance towards a middle-gray value (306). This middle gray value could be, for instance, a value of 0.5 when the luminance values range from 0 to 1 as described previously. The biasing will have the effect of brightening the dark sub-images, and darkening the light sub-images. In one embodiment of the present technique, the initial average luminance is moved toward middle gray as follows. A key function based on a tangent curve is employed, as exemplified by the key curve shown in FIG. 7. More specifically, this key curve is defined as:

$$k_{out}=0.5+c\tan(d\cdot(2k_{in}1))\tag{1}$$

where $k_{in}$ is the initial average luminance value computed from the initial histogram, $k_{out}$ is the new biased average luminance, and c and d are curve parameters. In tested embodiments of the present technique, c and d are chosen so that the curve can be controlled with a single parameter $p_k \in [0.1]$, where $d=0.5\pi \log(20p_k+1)/\log(21)$ and $$c = \frac{1}{2\tan(d)}.$$

If $p_k=0$ then the average luminance is unchanged, if $p_k=1$ then the output average luminance is always middle gray. In between, "dark" and "light" keys are smoothly brought towards middle gray based on their distance from middle gray. In tested embodiments $p_k$ was set to 0.4 with success.

Figure 5:
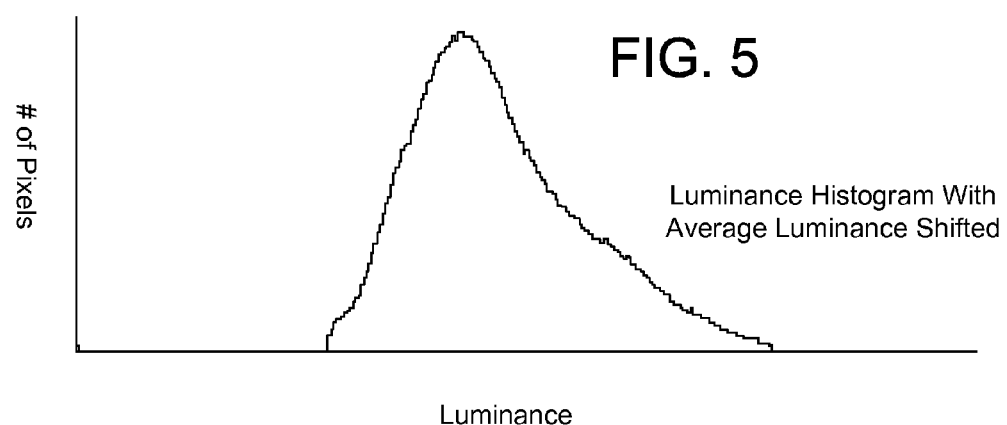
FIG. 5 is simplified graph of what the luminance histogram of FIG. 4 could look like when the average luminance value is biased toward middle gray.

FIG. 5 shows a simplified example of what the luminance histogram of FIG. 4 might look like with its average luminance shifted in accordance with the present technique.

Figure 6:
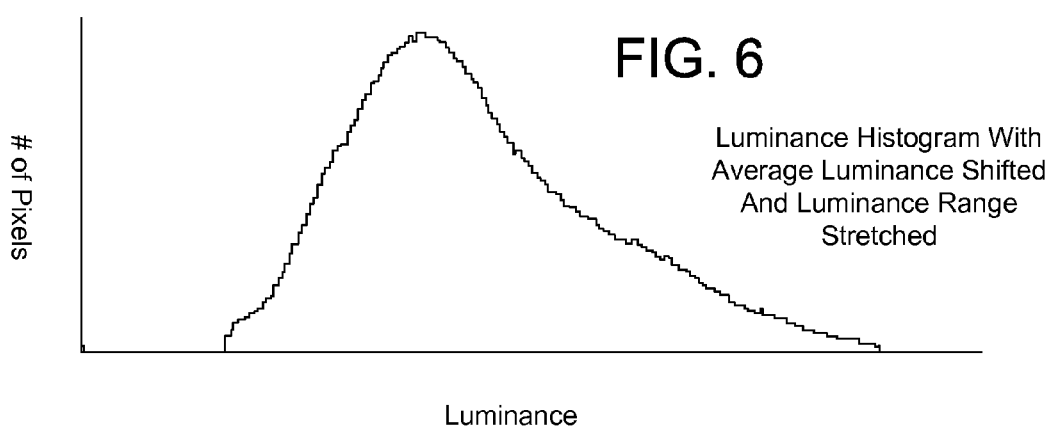
FIG. 6 is simplified graph of what the luminance histogram of FIG. 5 could look like when the luminance range is stretched.
Figure 8:
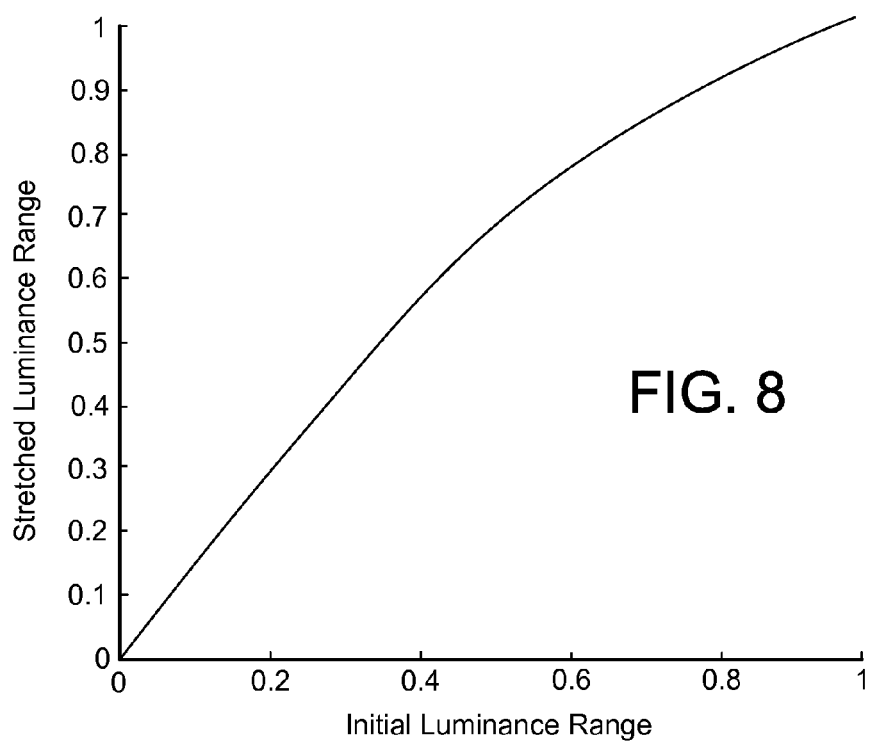
FIG. 8 is a graph of an exemplary stretching curve.

The aforementioned stretching involves expanding the luminance range of the now shifted luminance histogram to enhance the contrast (308). This is done assuming the range can be stretched. If the luminance range is already at its maximum limits, the stretching action would be skipped. Assuming the luminance range can be stretched, in one embodiment, a stretching function based on a sigmoid curve is employed, as exemplified by the stretching curve shown in FIG. 8. More specifically, this stretching curve is defined as:

$$s_{out} = \frac{s'_{out} - s_{out}(0)}{s_{out}(1) - s_{out}(0)} \tag{2}$$

$$s'_{out} = \frac{1}{1+\exp(-b\cdot(s_{in}+a))}$$

where $s_{in}$ is the initial range from the initial histogram, $s_{out}$ is the new stretched range and a and b are curve parameters. In tested embodiments of the present technique, a is set to −0.1 and b is set to $10p_s$ where $p_s \in [0.1]$. Thus, the curve is controlled with a single parameter, i.e., $p_s$. In tested embodiments $p_s$ was set to 0.4 with success. FIG. 6 shows a simplified example of what the luminance histogram of FIG. 5 might look like with its range stretched in accordance with the present technique.

It is noted that biasing and stretching functions other than the ones described above could be employed instead. Any biasing function that smoothly shifts the average luminance towards middle gray based on how close it is to that value, would be an appropriate substitute. Likewise, any stretching function that smoothly expanded the luminance range (assuming it can be expanded) based on how close its endpoints are to the luminance range limits would be an appropriate substitute.

Once the new biased average luminance and new stretched range have been established, a new luminance value is computed for each pixel of the sub-image under consideration (310). In one embodiment of the present technique, the new luminance value $Y_{out}$ of the pixel under consideration is computed as:

$$Y_{out}=s_{out}(Y_{in}-k_{in})+k_{out}, \tag{3}$$

where $Y_{in}$ is the initial luminance value of the pixel under consideration.

2.2 The Hysteresis Feature

It is noted that biasing and stretching the luminance histogram of a sub-image to its optimal value may not produce the best results when the sub-image is one of a series of such images rendered during a pan and zoom session. For example, small changes in the pan direction and/or zoom level can create large changes in the 1st and 99th percentiles in the luminance histogram of successive sub-images. Thus, it is possible to have noticeable shifts in the luminance from one successive sub-image to the next. It is desirable to avoid these oscillations in tone. In addition, just as the human visual system slowly adapts to sudden luminance changes, it is desirable that the tone adjustments produced in successive sub-images according to the present technique slowly "adapt" in a similar way. This can be accomplished by adding a hysteresis feature that blends the average luminance and stretch values computed for a current sub-image with those used in the sequence of previously rendered sub-images. For example, in one embodiment, the hysteresis feature can be added as follows:

$$k^*_t = H^* k_{out} + (1-H)k^*_{t-1} \quad (4)$$

$$s^*_t = H^* s_{out} + (1-H)s^*_{t-1} \quad (5)$$

where $k^*_t$ is a hysteresis-adapted average luminance value for the current sub-image t being rendered, $k_{t-1}$ is the hysteresis-adapted average luminance value for the sub-image t−1 rendered immediately before the current sub-image, H is a blending factor ranging between 0 and 1, $s^*_t$ is a hysteresis-adapted luminance range for the current sub-image t being rendered, and $s^*_{t-1}$ is the hysteresis-adapted luminance range for the sub-image t−1 rendered immediately before the current sub-image. It is noted that the foregoing hysteresis feature is employed beginning with the second sub-image in the sequence. The first sub-image in the sequence is tone mapped using the average biased luminance and the stretched luminance range as there is no previous luminance history available.

While the foregoing blending procedure was employed in tested embodiments of the present technique, other appropriate blending schemes can be used instead. Further, when the foregoing blending procedure is employed, H can vary between 0 and 1. In tested embodiments, H was set to 0.1 with success.

Once the hysteresis-adapted average luminance and hysteresis-adapted luminance range are established, a new luminance value is computed for each pixel of the sub-image under consideration. However, in this alternate embodiment which includes the hysteresis feature, the new luminance value for each pixel in the current sub-image t being rendered is computed as:

$$Y_{out_t} = s^*_t (Y_{in_t} - k_{in_t}) + k^*_t \quad (6)$$

where $Y_{out_t}$ is the new luminance value of a pixel under consideration in sub-image t, $s^*_t$ the hysteresis-adapted luminance range for the sub-image t, $Y_{in_t}$ is the initial luminance value of the pixel under consideration for the sub-image t, $k_{in_t}$ is the initial average luminance value of the initial luminance histogram for the sub-image t, and $k_t$ is the hysteresis-adapted average luminance for the sub-image t.

Figure 9:
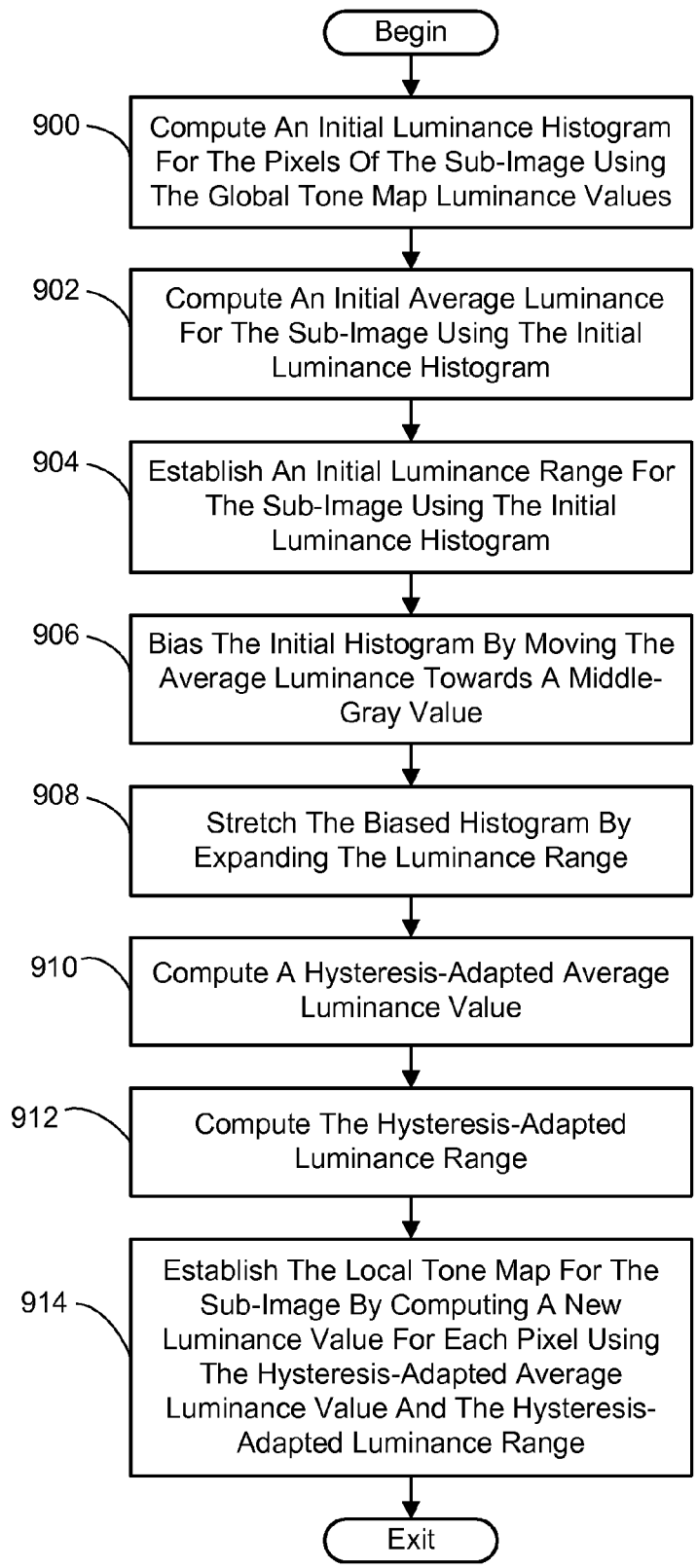
FIG. 9 is a flow diagram generally outlining one embodiment of a process for computing a local tone map for a sub-image of the wide angle, HDR image which employs a hysteresis feature.

A process flow diagram is shown in FIG. 9 that implements one embodiment of the dynamic tone mapping technique employing a hysteresis feature. In general, the procedure computes a local tone map for a sub-image that is one of a sequence of sub-images rendered during the panning and/or zooming of a wide angle, HDR image in the case where successive sub-images are offset from each other in viewing direction and/or zoom level. The procedure is begins as it did in FIG. 3, by first computing an initial luminance histogram for the pixels of the sub-image using the luminance values assigned to the pixels in the global tone map (900). The initial luminance histogram is then employed to compute an initial average luminance for the sub-image (902), and an initial range of the luminance values (904). Next, the initial histogram is biased by moving the average luminance towards a middle-gray value (906), and stretched by expanding the luminance range of the biased luminance histogram (908). At this point the procedures diverge. The next action 910 is to compute the hysteresis-adapted average luminance value, and then to compute the hysteresis-adapted luminance range (912). The hysteresis-adapted average luminance value and hysteresis-adapted luminance range are computed as described above for each sub-image after the first in the series. In the first frame, the average biased luminance and the stretched luminance range are employed instead. Finally, a new luminance value is computed for each pixel of the sub-image under consideration using the just computed hysteresis-adapted average luminance value and hysteresis-adapted luminance range (914).

3.0 Other Embodiments

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for tone mapping a sub-image of a wide angle, high dynamic range (HDR) image for display, comprising using a computer to perform the following process actions:
   computing, in advance of rendering the sub-image, a global tone map of the image; and
   using the global tone map during rendering of the sub-image to compute a local tone map for the sub-image based on an average luminance and a contrast of the pixels of the sub-image, said local tone map computation comprising,
      computing an initial luminance histogram for the pixels of the sub-image using luminance values assigned to the corresponding pixels in the global tone map,
      computing an initial average luminance for the sub-image from the initial luminance histogram,
      computing an initial luminance range for the sub-image from the initial luminance histogram,
      biasing the initial luminance histogram by shifting the average luminance towards middle gray using a prescribed luminance shifting function to produce a biased average luminance, wherein middle gray is defined as a luminance value falling mid-way between a largest possible luminance value and a smallest possible luminance value,
      stretching the shifted luminance histogram by increasing the initial luminance range to produce a stretched luminance range, if possible, thereby enhancing the contrast between the pixels, and
      establishing a local tone map for the sub-image by computing a new luminance value for each pixel of the sub-image using the biased average luminance and the stretched luminance range.

2. The process of claim 1, wherein the process action of computing the initial average luminance for the sub-image, comprises the actions of:
   identifying the luminance value associated with a prescribed upper percentile of the initial luminance histogram;
   identifying the luminance value associated with a prescribed lower percentile of the initial luminance histogram; and
   computing the initial average luminance for the sub-image as the average of the identified luminance values associated with the prescribed upper and lower percentiles of the initial luminance histogram.

3. The process of claim 2, wherein the process action of computing the initial luminance range for the sub-image, comprises an action of computing the initial luminance range as the difference between the identified luminance value associated with the prescribed upper percentile of the initial luminance histogram and the identified luminance value associated with the prescribed lower percentile of the initial luminance histogram.

4. The process of claim 3, wherein the prescribed upper percentile is the $99^{th}$ percentile, and the prescribed lower percentile is the $1^{st}$ percentile.

5. The process of claim 1, wherein the process action of biasing the initial luminance histogram towards middle gray, comprises an action of biasing the initial luminance histogram using a tangent curve function.

6. The process of claim 5, wherein the process action of biasing the initial luminance histogram using a tangent curve function, comprises an action of biasing the initial luminance histogram using the tangent curve equation $k_{out}$=0.5+c tan(d·(2$k_{in}$−1)), wherein $k_{in}$ is the initial average luminance, $k_{out}$ is a new biased average luminance, and c and d are curve parameters.

7. The process of claim 6, wherein curve parameter c is set to $$\frac{1}{2\tan(d)}$$

and curve parameter d is set to 0.5π·log(20$p_k$+1)/log(21) where $p_k$∈[0,1].

8. The process of claim 7, wherein $p_k$ is set to 0.4.

9. The process of claim 1, wherein the process action of stretching the shifted luminance histogram, comprises an action of stretching the initial luminance histogram using a sigmoid curve function.

10. The process of claim 9, wherein the process action of stretching the initial luminance histogram using a sigmoid curve function, comprises an action of stretching the initial luminance histogram using the sigmoid curve equation $$s_{out} = \frac{s'_{out} - s_{out}(0)}{s_{out}(1) - s_{out}(0)}$$

where $s_{out}$ is a new stretched luminous range, $$s'_{out} = \frac{1}{1+\exp(-b\cdot(s_{in}+a))},$$

$s_{in}$ is the initial luminance range, and a and b are curve parameters.

11. The process of claim 10, wherein curve parameter a is set to −0.1 and curve parameter b is set to 10$p_s$ where $p_s$∈[0,1].

12. The process of claim 1, wherein $p_s$ is set to 0.4.

13. The process of claim 1, wherein the process action of establishing the local tone map for the sub-image by computing a new luminance value for each pixel of the sub-image using the biased average luminance and the stretched luminance range, comprises an action of computing the new luminance value for each pixel of the sub-image using the equation $Y_{out}$=$s_{out}$($Y_{in}$−$k_{in}$)+$k_{out}$, where $Y_{out}$ is the new luminance value of a pixel under consideration, $s_{out}$ is the stretched luminous range, $Y_{in}$ is the initial luminance value of the pixel under consideration, $k_{in}$ is the initial average luminance of the initial luminance histogram and $k_{out}$ is the biased average luminance.

14. A computer-implemented process for tone mapping a sub-image of a wide angle, high dynamic range (HDR) image for display, wherein the sub-image is part of a sequence of sub-images which are offset from each other in viewing direction or zoom level, or both, comprising using a computer to perform the following process actions:

computing a global tone map of the wide angle, HDR image;

computing an initial luminance histogram for the pixels of the sub-image using luminance values assigned to the corresponding pixels in the global tone map;

computing an initial average luminance for the sub-image from the initial luminance histogram;

computing a luminance range for the sub-image from the initial luminance histogram;

biasing the initial luminance histogram by shifting the average luminance towards middle gray using a prescribed luminance shifting function to produce a new average luminance value, wherein middle gray is defined as a luminance value falling mid-way between a largest possible luminance value and a smallest possible luminance value;

stretching the shifted luminance histogram by increasing the luminance range, if possible, to produce a new luminance range;

computing a hysteresis-adapted average luminance value by blending the new average luminance value with the average luminance value computed for the immediately preceding sub-image in the sequence, whenever the sub-image under consideration is not the first sub-image in the sequence;

computing a hysteresis-adapted luminance range by blending the new luminance range with the luminance range computed for the immediately preceding sub-image in the sequence, whenever the sub-image under consideration is not the first sub-image in the sequence; and establishing a local tone map for the sub-image by computing a new luminance value for each pixel of the sub-image using the hysteresis-adapted average luminance value and hysteresis-adapted luminance range.

15. The process of claim 14, wherein the process action of computing the hysteresis-adapted average luminance value, comprises an action of computing the equation $k^*_t$=H*$k_{out}$+(1−H)$k^*_{t-1}$, wherein $k^*_t$ is the hysteresis-adapted average luminance value for the sub-image t under consideration, H is a blending factor ranging between 0 to 1, $k_{out}$ is the new average luminance value, and $k^*_{t-1}$ is the hysteresis-adapted average luminance value for the sub-image t−1 coming immediately before the sub-image under consideration in the sequence of sub-images.

16. The process of claim 15, wherein the process action of computing the hysteresis-adapted luminance range, comprises an action of computing the equation $s^*_t$=H*s+(1−H)$s^*_{t-1}$, wherein $s^*_t$ is a hysteresis-adapted luminance range for the sub-image t under consideration, $s_{out}$ is the new luminance range and $s^*_{t-1}$ is the hysteresis-adapted luminance range for the sub-image t−1 coming immediately before the sub-image under consideration in the sequence of sub-images.

17. The process of claim 16, wherein the blending factor H is set between 0 and 1.

18. The process of claim 14, wherein the process action of establishing the local tone map for the sub-image by computing a new luminance value for each pixel of the sub-image using the hysteresis-adapted average luminance value and hysteresis-adapted luminance range, comprises an action of computing the new luminance value for each pixel of the sub-image t using the equation $Y_{out_t} = s^*_t(Y_{in_t} - k_{in_t}) + k^*_t$, wherein $Y_{out_t}$ is the new luminance value of a pixel under consideration in sub-image t, $s^*_t$ is the hysteresis-adapted luminance range for the sub-image t, $Y_{in_t}$ is the initial luminance value of the pixel under consideration for the sub-image t, $k_{in_t}$ is the initial average luminance of the initial luminance histogram for the sub-image t, and $k^*_t$ is the hysteresis-adapted average luminance value for the sub-image t.

19. A computer-readable storage medium having computer-executable instructions stored thereon for performing the process actions recited in claim 14.

* * * * *

UNITED STATES PATENT AND TRADEMARK OFFICE
CERTIFICATE OF CORRECTION

PATENT NO. : 7,983,502 B2  
APPLICATION NO. : 11/834238  
DATED : July 19, 2011  
INVENTOR(S) : Michael F. Cohen et al.

Page 1 of 1

It is certified that error appears in the above-identified patent and that said Letters Patent is hereby corrected as shown below:

In column 9, line 58, in Claim 12, delete "1," and insert -- 11, --, therefor.

In column 10, line 56, in Claim 16, delete "$s^*_t = H^*s + (1-H)s^*_{t-1}$," and insert -- $s^*_t = H^*s_{out} + (1-H)s^*_{t-1}$, --, therefor.

Signed and Sealed this  
Twenty-first Day of February, 2012

David J. Kappos  
*Director of the United States Patent and Trademark Office*